US010963571B2

(12) United States Patent
Bar Joseph et al.

(10) Patent No.: US 10,963,571 B2
(45) Date of Patent: Mar. 30, 2021

(54) PRIVACY RISK ASSESSMENTS

(71) Applicant: ENTIT SOFTWARE LLC, Sanford, NC (US)

(72) Inventors: Gabi Bar Joseph, Yehud (IL); Yaniv Toledano, Yehud (IL); Tomer Gershoni, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 224 days.

(21) Appl. No.: 15/776,321

(22) PCT Filed: Nov. 17, 2015

(86) PCT No.: PCT/US2015/061016
§ 371 (c)(1),
(2) Date: May 15, 2018

(87) PCT Pub. No.: WO2017/086926
PCT Pub. Date: May 26, 2017

(65) Prior Publication Data
US 2018/0330100 A1 Nov. 15, 2018

(51) Int. Cl.
G06F 21/57 (2013.01)
G06Q 50/10 (2012.01)
(Continued)

(52) U.S. Cl.
CPC ........ G06F 21/577 (2013.01); G06F 21/6245 (2013.01); G06F 21/6263 (2013.01);
(Continued)

(58) Field of Classification Search
CPC ............... G06F 21/577; G06F 21/6245; G06F 21/6263; G06Q 50/10; G06Q 2220/00; H04L 63/20; H04L 63/16; H04W 12/08
(Continued)

(56) References Cited

U.S. PATENT DOCUMENTS 6,895,577 B1 * 5/2005 Noble ................. G06F 11/3676
714/38.12
8,495,583 B2 * 7/2013 Bassin ...................... G06F 8/10
717/127
(Continued)

FOREIGN PATENT DOCUMENTS

KR 1020140108445 9/2014

OTHER PUBLICATIONS

International Searching Authority., International Search Report and Written Opinion dated Jul. 28, 2016 for PCT Application No. PCT/US2015/061016 Filed Nov. 17, 2015. 13 pages.
(Continued)

Primary Examiner — Badri Narayanan Champakesan

(57) ABSTRACT

Example implementations relate to privacy risk assessments. Some implementations may include a privacy risk identification engine to automatically identify privacy risks in an application based on an analysis of application code. Additionally, some implementations may include a privacy risk identification engine to obtain privacy risk information related to each of the privacy risks. Moreover, some implementations may include a privacy risk assessment engine to assess a severity of each of the privacy risks based on an analysis of the privacy risk information. In some examples, the analysis may include a determination of, for each of the privacy risks, a risk impact and a risk likelihood.

20 Claims, 4 Drawing Sheets

(51) Int. Cl.
*G06F 21/62* (2013.01)
*H04L 29/06* (2006.01)
*H04W 12/08* (2021.01)

(52) U.S. Cl.
CPC ............ *G06Q 50/10* (2013.01); *H04L 63/16* (2013.01); *H04L 63/20* (2013.01); *H04W 12/08* (2013.01); *G06Q 2220/00* (2013.01)

(58) Field of Classification Search
USPC .......................................................... 726/25
See application file for complete search history.

(56) References Cited

U.S. PATENT DOCUMENTS

| | | | | |
|---|---|---|---|---|
| 8,516,594 | B2* | 8/2013 | Bennett | G06T 11/001 |
| | | | | 726/25 |
| 8,527,955 | B2* | 9/2013 | Baker | G06F 11/3668 |
| | | | | 717/126 |
| 8,645,921 | B2* | 2/2014 | Bassin | G06Q 10/0635 |
| | | | | 717/127 |
| 8,819,772 | B2* | 8/2014 | Bettini | H04L 67/34 |
| | | | | 726/1 |
| 8,826,446 | B1* | 9/2014 | Liu | H04L 67/306 |
| | | | | 726/26 |
| 10,146,673 | B2* | 12/2018 | Koren | G06F 8/70 |
| 10,318,740 | B2* | 6/2019 | Toledano | H04L 63/06 |
| 2003/0023451 | A1* | 1/2003 | Willner | H04L 63/105 |
| | | | | 713/151 |
| 2005/0283622 | A1* | 12/2005 | Hall | G06F 21/51 |
| | | | | 713/190 |
| 2007/0283171 | A1* | 12/2007 | Breslin | G06Q 10/10 |
| | | | | 713/193 |
| 2008/0178287 | A1* | 7/2008 | Akulavenkatavara | |
| | | | | G06F 11/3644 |
| | | | | 726/22 |
| 2009/0024663 | A1* | 1/2009 | McGovern | G06F 21/577 |
| 2010/0242028 | A1* | 9/2010 | Weigert | G06F 21/105 |
| | | | | 717/131 |
| 2010/0257610 | A1* | 10/2010 | Hohl | G06F 21/577 |
| | | | | 726/25 |
| 2011/0029566 | A1* | 2/2011 | Grandison | G06Q 10/10 |
| | | | | 707/783 |
| 2011/0093955 | A1* | 4/2011 | Chen | G06F 21/577 |
| | | | | 726/25 |
| 2011/0154063 | A1* | 6/2011 | Tani | G06F 21/6209 |
| | | | | 713/193 |
| 2012/0023586 | A1* | 1/2012 | Flickner | G06F 16/2455 |
| | | | | 726/25 |
| 2012/0072991 | A1* | 3/2012 | Belani | H04W 4/50 |
| | | | | 726/25 |
| 2012/0216076 | A1* | 8/2012 | Macik | G06F 11/3612 |
| | | | | 714/38.1 |
| 2013/0227683 | A1* | 8/2013 | Bettini | G06F 21/53 |
| | | | | 726/22 |
| 2014/0214610 | A1* | 7/2014 | Moshir | G06O 20/4016 |
| | | | | 705/26.35 |
| 2016/0112451 | A1* | 4/2016 | Jevans | H04L 63/1433 |
| | | | | 726/25 |
| 2017/0091072 | A1* | 3/2017 | Atyam | G06F 8/65 |

OTHER PUBLICATIONS

Smit, M., Detecting Privacy Infractions in E-commerce Software Applications: a Framework and Methodology, Aug. 11, 2006, Dalhousie University, 150 pages.

Derrick Harris, "New Microsoft privacy framework lets lawyers, developers and their code speak the same language", May 27, 2014, 5 pages. <https://gigaom.com/2014/05/27/new-microsoft-privacy-framework-lets-lawyers-developers-and-their-code-speak-the-same-language/>.

Microsoft, "Trustworthy Computing", posted online on Apr. 12, 2014, 2 pages. <http://web.archive.org/web/20141229002713/http://www.microsoft.com/en-us/twc/privacy/commitment.aspx>.

* cited by examiner

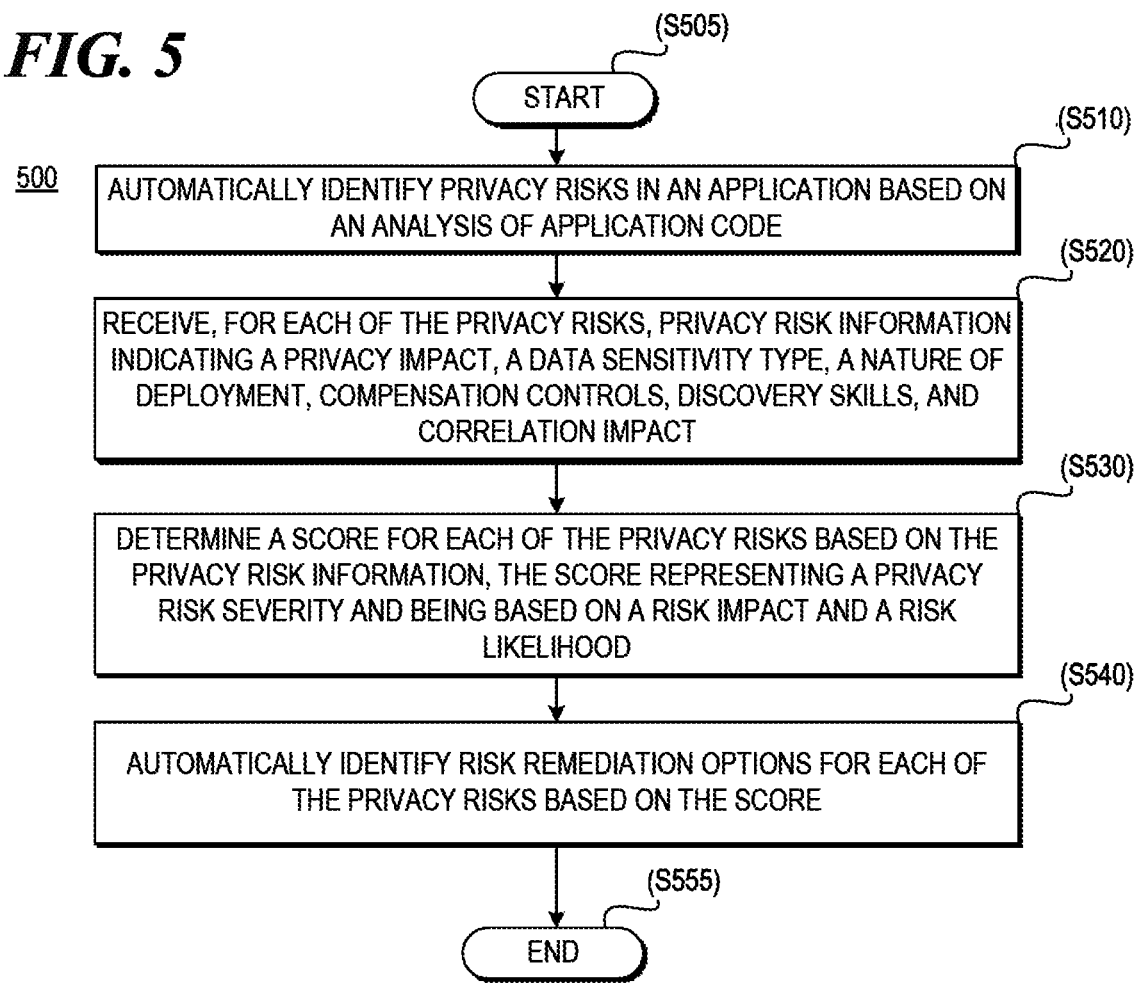

PRIVACY RISK ASSESSMENTS

BACKGROUND

Some applications may require the exchange of private information over a network, such as the internet. When private information is exchanged, there may be a risk that the private information is seen or otherwise accessed by those who are not authorized to do so.

BRIEF DESCRIPTION OF THE DRAWINGS

The following detailed description references the drawings, wherein:

FIG. 5 is a flow chart of an example process for privacy risk assessments consistent with disclosed implementations.

DETAILED DESCRIPTION

Figure 1:
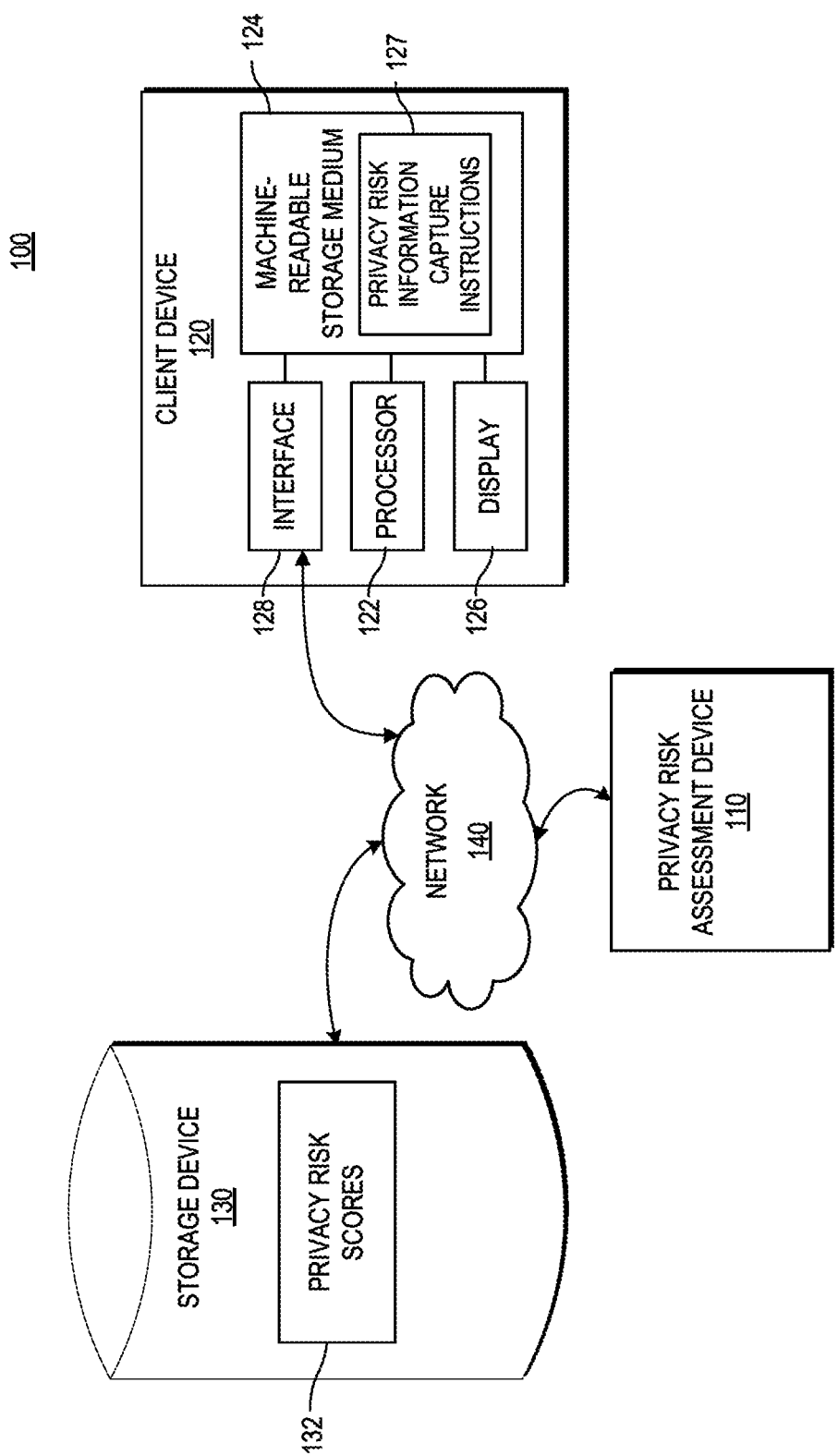
FIG. 1 is a block diagram of an example system for privacy risk assessments consistent with disclosed implementations.

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

As discussed above, some applications may require the exchange of private information over a network, such as the internet. This private information can include personal identifiable information, such as information that can be used to distinguish or trace an individual's identity alone or when combined with other personal or identifying information which is linked or linkable to a specific individual (e.g., name, social security number, biometric records, date and place of birth, mother's maiden name, and the like). When private information is exchanged, there may be a risk (e.g., a privacy risk) that the private information is seen or otherwise accessed by those who are not authorized to do so. As this exchange of private information may be regulated by legislation, privacy risks may need to be identified during application development. Traditional methods of identifying these risks may have included non-developers taking a high-level look at a product itself rather than any application code. However, this approach may not have resulted in accurate identification and/or assessment of each of the privacy risks in the application. For example, privacy risks may exist that aren't identifiable from a visual inspection of the product, and any evaluations of identified risks may be holistic in nature. Accordingly, privacy risks need to be accurately defined and measured based on privacy risk assessments.

Examples disclosed herein provide privacy risk assessments. To this end, example may automatically identify privacy risks in an application based on an analysis of application code, obtain privacy risk information related to teach of the privacy risks, and/or assess a severity of each of the privacy risks based on an analysis of the privacy risk information, the analysis including a determination of, for each of the privacy risks, a risk impact and a risk likelihood.

Referring now to the drawings, FIG. 1 is a block diagram of an example system 100 for privacy risk assessments. System 100 may be implemented in a number of different configurations without departing from the scope of the disclosed examples. In the example shown in FIG. 1, system 100 may include a privacy risk assessment device 110, a client device 120, a storage device 130, and a network 140 for connecting privacy risk assessment device 110 with client device 120 and/or storage device 130.

Privacy risk assessment device 110 may be a computing system that performs various functions consistent with disclosed examples. For example, privacy risk assessment device 110 may be a server, a desktop computer, a laptop computer, and/or any other suitable type of computing device. In some examples, privacy risk assessment device 110 may process information received from client device 120 and/or storage device 130. For example, privacy risk assessment device 110 may automatically identify privacy risks in an application based on an analysis of application code, obtain privacy risk information related to each of the privacy risks, and assess a severity of each of the privacy risks based on an analysis of the privacy risk information. In some implementations, the analysis may include a determination of, for each of the privacy risks, a risk impact and a risk likelihood. Examples of privacy risk assessment device 110 and certain functions that may be performed by device 110 are described in greater detail below with respect to, for example, FIGS. 2-5.

Client device 120 may be a computing system operated by a user. For example, client device 120 may be a desktop computer, a laptop computer, a tablet computing device, a mobile phone, and/or any other suitable type of computing device. In some examples, client device 120 may be a computing device to perform operations consistent with certain disclosed implementations. For example, client device 120 may transmit privacy risk information, such as privacy risk questionnaire responses and/or other information related to privacy risks to privacy risk assessment device 110.

Client device 120 may include a processor to execute instructions stored in a machine-readable storage medium. In the example shown in FIG. 1, client device 120 may include a processor 122, a machine-readable storage medium 124, a display device 126, and an interface 128. Processor 122 of client device 120 may be at least one processing unit (CPU), microprocessor, and/or another hardware device to execute instructions to perform operations. For example, processor 122 may fetch, decode, and execute instructions stored in machine-readable storage medium 124 (such as privacy risk information capture instructions 127) to capture privacy risk information entered in response to identifying a privacy risk. Machine-readable storage medium 124 may be any electronic, magnetic, optical, or other non-transitory storage device that stores instructions executed by processor 122. Display 126 may be any type of display device that presents information, such as a user interface to capture the privacy risk information, from client device 120. Interface 128 may be any combination of hardware and/or programming that facilitates the exchange of data between the internal components of client device 120 and external components, such as privacy risk assessment device 110. In some examples, interface 128 may include a network interface device that allows client device 120 to receive and send data to and from various components, such as to and from privacy risk assessment device 110 via network 140.

Storage device 130 may be any type of storage system configuration that facilitates the storage of data. For example, storage device 130 may facilitate the locating, accessing, retrieving, and/or obtaining of data related to privacy risks identified by privacy risk assessment device 110, such as privacy risk scores 132 that may be assigned to each of the privacy risks based on an analysis of privacy risk information. Storage device 130 can be populated by a number of methods. For example, privacy risk assessment device 110 may populate storage device 130 by receiving, accessing, and/or otherwise obtaining data related to privacy risk scores assigned by privacy risk assessment device. This data may include information indicating which portions of code correspond to the privacy risk, the type of indicator that could be displayed on the portions of code, and/or any other suitable information. While in the example shown in FIG. 1 storage device 130 is a single component external to components 110 and 120, storage device 130 may comprise separate components and/or may be part of devices 110, 120, and/or another device. In some implementations, storage device 130 may be managed by components of device 110 and/or other devices that are capable of accessing, creating, controlling and/or otherwise managing data remotely through network 140.

Network 140 may be any type of network that facilitates communication between remote components, such as privacy risk assessment device 110 and client device 120. For example, network 140 may be a local area network (LAN), a wide area network (WAN), a virtual private network, a dedicated intranet, the Internet, and/or a wireless network.

The arrangement illustrated in FIG. 1 is simply an example, and system 100 may be implemented in a number of different configurations. For example, while FIG. 1 shows one privacy risk assessment device 110, client device 120, storage device 130, and network 140, system 100 may include any number of components 110, 120, 130, and 140, as well as other components not depicted in FIG. 1. For example, system 100 may omit any of components 110, 120, 130, and 140, and/or the functionality of at least one of components 110, 120, 130, and 140 may be incorporated into another component (e.g., components 110, 120, 130, 140, and/or a component not shown in FIG. 1).

Figure 2:
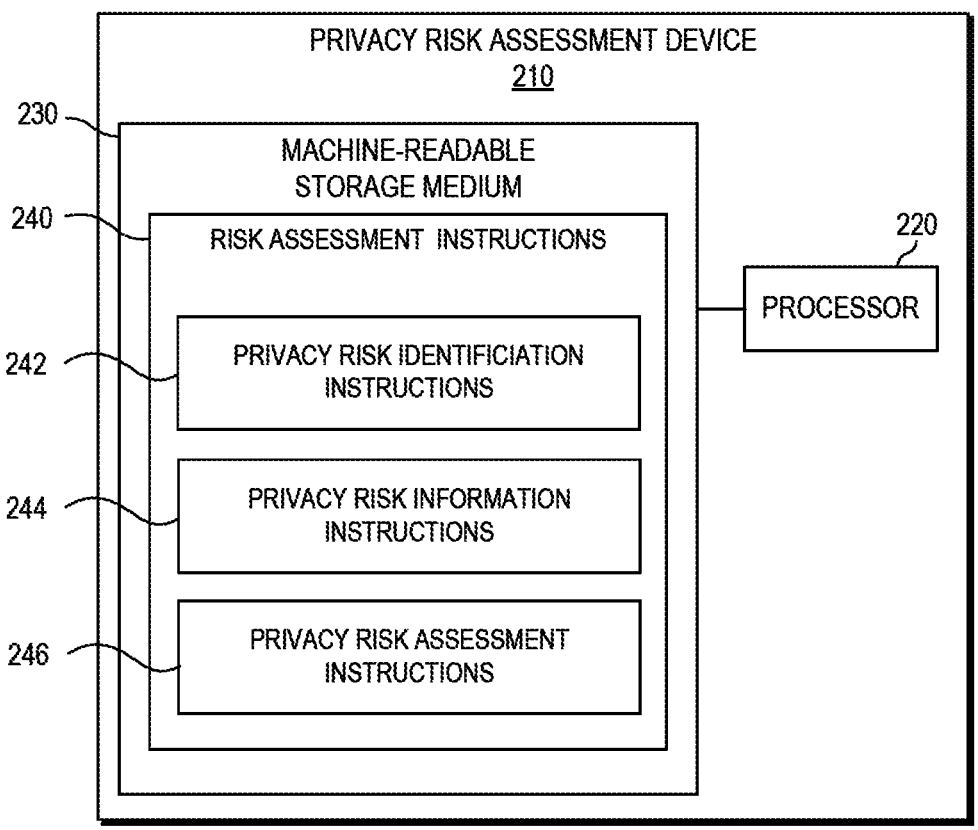
FIG. 2 is a block diagram of an example privacy risk assessment device consistent with disclosed implementations.

FIG. 2 is a block diagram of an example privacy risk assessment device 210 consistent with disclosed implementations. In certain aspects, privacy risk assessment device 210 may correspond to privacy risk assessment device 110 of FIG. 1. Privacy risk assessment device 210 may be implemented in various ways. For example, device 210 may be a special purpose computer, a server, a mainframe computer, and/or any other suitable type of computing device. In the example shown in FIG. 2, privacy risk assessment device 210 may include a processor 220 and a machine-readable storage medium 230.

Processor 220 may be at least one processing unit (CPU), microprocessor, and/or another hardware device to execute instructions to perform operations. For example, processor 220 may fetch, decode, and execute identification instructions 240 (e.g., instructions 242, 244, and/or 246) stored in machine-readable storage medium 230 to perform operations consistent with disclosed examples.

Machine-readable storage medium 230 may be any electronic, magnetic, optical, and/or other physical storage device that stores executable instructions. Thus, machine-readable storage medium 230 may be, for example, memory, a storage drive, an optical disc, and the like. In some implementations, machine-readable storage medium 230 may be a non-transitory machine-readable storage medium, where the term "non-transitory" does not encompass transitory propagating signals. Machine-readable storage medium 230 may be encoded with instructions that, when executed by processor 230, perform operations consistent with disclosed implementations. For example, machine-readable storage medium 240 may include instructions that perform operations to automatically identify privacy risks in an application based on an analysis of application code, obtain privacy risk information related to each of the privacy risks, and assess a severity of each of the privacy risks based on an analysis of the privacy risk information, the analysis including a determination of, for each of the privacy risks, a risk impact and a risk likelihood. In the example shown in FIG. 2, machine-readable storage medium 230 may include privacy risk identification instructions 242, privacy risk information instructions 244, and privacy risk assessments instructions 246.

Privacy risk identification instructions 242 may function to automatically identify privacy risks in an application based on an analysis of application code. In some implementations, when privacy risk identification instructions 242 are executed by processor 220, privacy risk identification instructions 242 may cause processor 220 and/or another processor to perform data flow scanning and/or code scanning to identify the privacy risks. For example, data flow scanning may identify data flows in the application that match certain predetermined data flows, such as flows that require the entry of credit card information. As another example, code scanning may perform an automatic review of the code to identify parameters that include phrases relevant to privacy, such as "password," "username," and the like and may verify, based on privacy rules accessible by the system, that the code is treating the identified parameters in a secure manner, such as by encrypting the parameters, cleaning the parameters after each use, and the like. Examples of automatically identifying privacy risks in an application based on an analysis of application code are described in further detail below with respect to, for example, FIGS. 3-5.

Privacy risk information instructions 244 may function to obtain privacy risk information related to each of the privacy risks. In some implementations, when privacy risk information instructions 244 are executed by processor 220 and/or another processor, privacy risk information instructions 244 may cause the generation of a privacy risk questionnaire and may receive a response to the privacy risk questionnaire, where the response includes the privacy risk information. For example, privacy risk information instructions 244, when executed, may cause the generation of a privacy risk questionnaire, cause the display of the privacy risk questionnaire on a display device, such as display 126 of client device 120, cause the capturing of the responses to the privacy questionnaire, and cause the transmitting of the responses to the privacy risk questionnaire to another device, such as privacy assessment device 210.

In some implementations, the privacy risk questionnaire may include questions relating to a number of different types of privacy segments, such as questions relating to at least two of privacy impact (e.g., the potential impact on the business offering the software, such as potential penalties and reputational damage), data sensitivity type (e.g., the sensitivity of the data at risk, such as healthcare information, financial information, username information, opinions, pictures, etc.), nature of deployment (e.g., the type of application deployment, such as a mobile deployment, a cloud deployment, an on-premise deployment, etc.), compensating controls (e.g., the extent to which controls to compensate for the privacy risk is in place, such as encryption, security controls, audit logs, etc.), discovery skills (e.g., the skills and effort potentially required to exploit the privacy risk, such as technical hacking knowledge, physical access, etc.), and correlation impact (e.g., the extent to which the risk may be exploited by other privacy or security risks).

In some implementations, the privacy risk questionnaire may include a number of pre-populated questions and pre-populated responses that a user can select from (e.g., via radio button, drop down menu, checkbox, etc.) to provide privacy risk information to privacy risk assessment device 210. Thus, in some implementations, the privacy risk information may include the selected pre-populated responses to the question, a numerical value associated with the selected pre-populated responses, and/or any other suitable information. For example, the privacy risk information may include information responsive to the questions on the privacy risk questionnaire, such as privacy impact information (e.g., information responsive to questions related to the privacy impact segment), data sensitivity type information (e.g., information responsive to questions related to the data sensitivity type segment), nature of deployment information (e.g., information responsive to questions related to the data sensitivity type segment), compensating controls information (e.g., information responsive to questions related to the compensating controls segment), discovery skills information (e.g., information responsive to questions related to the discovery skills segment), and correlation impact information (e.g., information responsive to questions related to the correlation impact segment). Examples of obtaining privacy risk information related to each of the privacy risks are described in further detail below with respect to, for example, FIGS. 3-5.

Privacy risk assessment instructions 246 may function to assess a severity of each of the privacy risks based on an analysis of the privacy risk information. In some implementations, when privacy risk assessments instructions 246 are executed by processor 220, privacy risk assessments instructions 246 may cause processor 220 to determine, for each of the privacy risks, a risk impact and a risk likelihood.

In some implementations, the risk impact and the risk likelihood may be determined by a number of scores (e.g. numerical values) assigned by privacy risk assessment device 210. For example, privacy risk information instructions 244, when executed by a processor, may assign, for each of the privacy risks, a privacy impact score, a data sensitivity type score, a nature of deployment score, a compensating controls score, a discovery skills score, and/or a correlation impact score. For example, the privacy impact score may be based on the privacy impact information, the data sensitivity type score may be based on the data sensitivity type information, the nature of deployment score may be based on the nature of deployment information, the compensating controls score may be based on the compensating controls information, the discovery skills score may be based on the discovery skills information, and the correlation impact score may be based on the correlation impact information. In some implementations, responses to questions that demonstrate a greater likelihood of risk impact may be assigned larger numerical values. For example, if the privacy impact information for a first privacy risk includes information that indicates that the first privacy risk may result in high reputational damage, it may be assigned a higher privacy impact score (e.g., "1") than a second privacy risk which may result in moderate reputational damage (e.g., "0.5").

In some implementations, there may be multiple questions related to a particular segment, and responses to each question may be assigned a score. For example, if the privacy risk questionnaire includes two questions related to privacy impact, responses to both can be assigned a score using, for example, the methods described above. To identify the privacy impact score in this example, privacy risk assessment instructions 246, when executed, may select the maximum value of those two scores as the privacy impact score. In some implementations, each of the scores related to a particular segment (e.g., privacy impact score, discovery skills score) may be within the same range (e.g., between 0 and 1) while in other implementations at least one of the scores related to a particular segment may differ (e.g., privacy impact score, the data type sensitivity score, and/or the nature of deployment score, may be assigned a value between 0 and 1, while the correlation impact score may be assigned a value between 0 and 1.2).

In some implementations, the risk impact and the risk likelihood are based on the privacy impact score, the data sensitivity type score, the nature of deployment score, the compensating controls score, the discovery skills score, and/or the correlation impact score. For example, the risk impact may be based on the privacy impact score and the data type sensitivity score, and the risk likelihood may be based on the nature of deployment score, the compensating controls score, and the discovery skills score. In some implementations, each of the privacy impact score, the data type sensitivity score, the nature of deployment score, and the compensating controls score may be assigned a different weighting factor. For example, to determine the risk impact, the privacy impact score (P) may be multiplied by a weighting factor (e.g., 4), the data type score (DT) may be multiplied by another weighting factor (e.g., 6), and both can be added together (e.g., 4P+6DT). As another example, to determine the risk likelihood, the nature of deployment score (D) may be multiplied by a weighting factor (e.g., 6), the compensating controls score (CC) may be multiplied by another weighting factor (e.g., 2), and the discovery skills score (S) may be multiplied by yet another weighting factor (e.g., 2). These weighted scores may be added together (6D+2CC+2S) and multiplied by another weighing factor (e.g., 0.1) to determine the risk likelihood. While in these examples there are a number of different types of weighting factors, various weighting factors may be used.

In some implementations, privacy risk assessment instructions 246 may function to categorize each of the privacy risks based on the assessed severity. For example, privacy risk assessment instructions 246, when executed, may assign a privacy risk score based on the risk impact and the risk likelihood, and may categorize each of the privacy risks based on the privacy risk score. In some implementations, the privacy risk score may be assigned by multiplying the risk impact, the risk likelihood, and the correlation impact score (CI) (e.g., CI×[(4P+6DT)(6D+2CC+2S)×0.1]).

In some implementations, the privacy risks may be categorized based on the privacy risk score falling within certain privacy risk ranges. For example, if the privacy risk score is less than 1.5, the particular privacy risk may be categorized as "low," if the privacy risk score is greater than or equal to 1.5 and less than 4.5, the particular privacy risk may be categorized as "medium," if the privacy risk score is greater than or equal to 4.5 and less than 7.5, the particular privacy risk may be categorized as "high", and privacy scores equal to or greater than 7.5 may be categorized as "critical," While in this example particular ranges were identified as corresponding to "low," "medium," "high," and "critical," various other ranges as well as categorizes may be utilized consistent with the disclosure.

In some implementations, privacy risk assessment instructions 246 may function to assign an identifier to each of the privacy risks based on the categorization. The identifier may comprise text, graphics, a combination of text and graphics, and/or any other information capable of indicating that particular application code corresponds to a particular privacy risk categorization. For example, privacy risk assessment instructions 246, when executed by a processor, may assign a semi-transparent red block to privacy risks identified as "critical," a semi-transparent orange block to privacy risks identified as "high," a semi-transparent yellow block to privacy risks identified as "medium," and a semi-transparent green block to privacy risks identified as "low," These semi-transparent blocks may appear to resemble highlighting. As another example, dots of various colors could be assigned as indicators. These (and other) indicators may be placed within the application code to graphically depict the particular privacy risks that the code represents to, for example, a developer of the application. For example, privacy risk assessment instructions 246, when executed, may cause the superimposing of the assigned identifier on corresponding portions of the application code. This application code (and/or the superimposed identifier) may be displayed on a display device such as display 126 of client device 120.

In some implementations, privacy risk assessment instructions 246 may function to determine risk remediation options for each of the privacy risks based on the assessed severity and/or to automatically generate a product risks working report. In some implementations, the product risks working report may include each of the privacy risks and the risk remediation options. For example, privacy risk assessment instructions 246, when executed by a processor, may determine risk remediation options based on the particular risk involved and the assessed severity of the risk. For example, a storage device (e.g., storage device 130) may include a set of rules that identify a number of risks and what actions to perform to remediate those risks based on the privacy risk score and/or the categorization of the privacy risk. Privacy risk assessment instructions may access that set of rules, compare the particular identified privacy risk to the privacy risks in the set of rules, and determine the risk remediation option for the particular risk based on the severity. Each of the identified risks and their determined risk remediation option may be included in the product risks working report. In some examples, multiple options for risk remediation may be provided for a single identified privacy risk. Examples of assessing a severity of each of the privacy risks based on an analysis of the privacy risk information are described in further detail below with respect to, for example, FIGS. 3-5.

Figure 3:
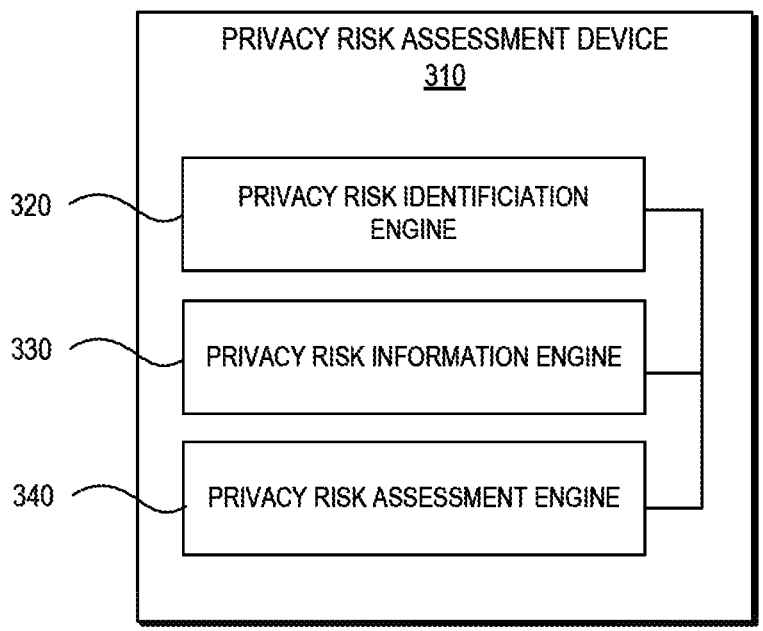
FIG. 3 is a block diagram of an example privacy risk assessment device consistent with disclosed implementations.

FIG. 3 is a block diagram of an example privacy risk assessment device 310 consistent with disclosed implementations. In certain aspects, privacy risk assessment device 310 may correspond to privacy risk assessment device 110 of FIG. 1 and/or privacy risk assessment device 210 of FIG. 2. Device 310 may be implemented in various ways. For example, device 310 may be a special purpose computer, a server, a mainframe computer, and/or any other suitable type of computing system. In the example shown in FIG. 3, device 310 may include a privacy risk identification engine 320, a privacy risk information engine 330, and a privacy risk assessment engine 340.

Engines 320, 330, and 340 may be electronic circuitry for implementing functionality consistent with disclosed examples. For example, engines 320, 330, and 340 may represent combinations of hardware devices and programming to implement the functionality consistent with disclosed implementations. In some examples, the functionality of engines 320, 330, and/or 340 may correspond to operations performed by privacy risk assessment device 210 of FIG. 2, such as operations performed when identification instructions 240 are executed by processor 220 (described above with respect to FIG. 2). In FIG. 3, privacy risk identification engine 320 may represent a combination of hardware and programming that performs operations similar to those performed when processor 220 executes privacy risk identification instructions 242. Similarly, privacy risk information engine 330 may represent a combination of hardware and programming that performs operations similar to those performed when processor 220 executes privacy risk information instructions 244, and privacy risk assessment engine 340 may represent a combination of hardware and programming that performs operations similar to those performed when processor 220 executes privacy risk assessment instructions 246.

Figure 4:
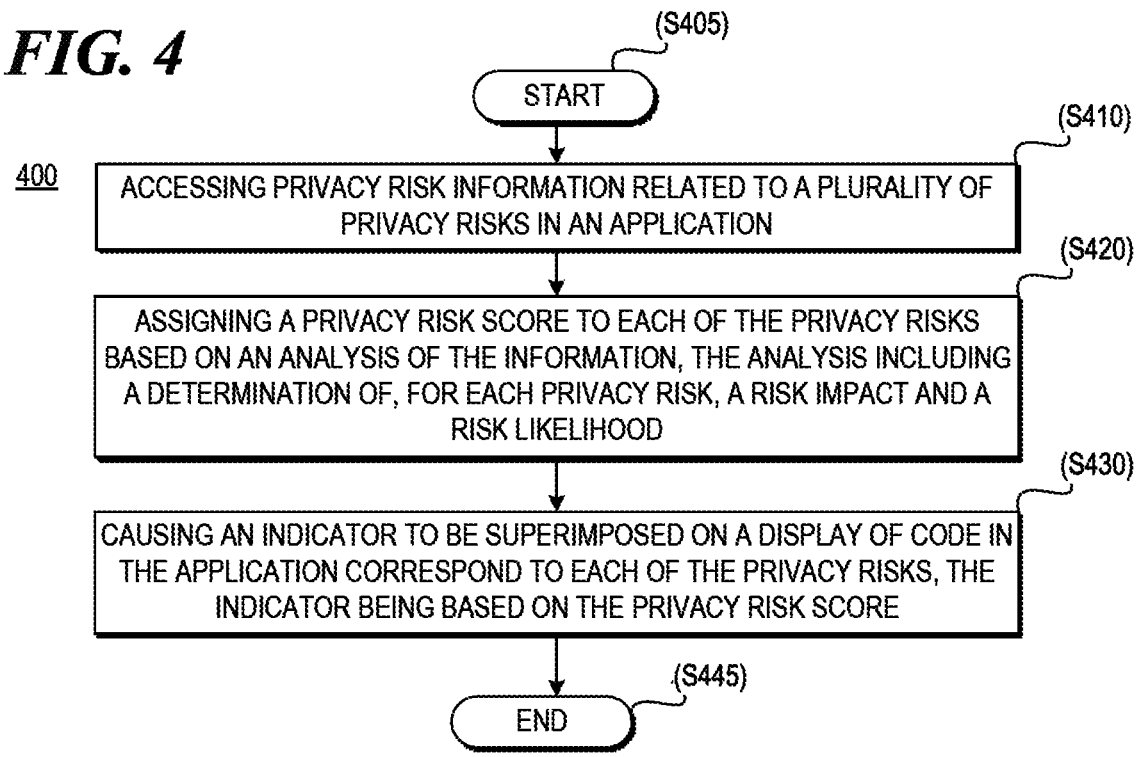
FIG. 4 is a flow chart of an example process for privacy risk assessments consistent with disclosed implementations.

FIG. 4 is a flow chart of an example process 400 for privacy risk assessment consistent with disclosed implementations. Although execution of process 400 is described below with reference to system 100 of FIG. 1 and/or specific components of system 100, other suitable systems for execution of at least one step of process 400 may be used. For example, processes described below as being performed by privacy risk assessment device 110 may be performed by privacy risk assessment device 210, privacy risk assessment device 310, and/or any other suitable system. Process 400 may be implemented in the form of executable instructions stored on a machine-readable storage medium and/or in the form of electronic circuitry.

Process 400 may start (step S405) after privacy risks in an application have been identified. For example, processor 122 of client device 120 may execute privacy risk information capture instructions 127 to capture privacy risk information. Client device 120 may transmit the captured privacy risk information to privacy risk assessment device 110 and/or storage device 130 using, for example, interface 128 and network 140. In some implementations, the transmitted privacy risk information may be stored in a manner than links them with the particular risk (e.g., with the name of the risk, the risk severity, the privacy risk score, the risk impact, the risk likelihood, the location of the code related to the identified risk, and/or any other information related to privacy risk assessment).

Process 400 may include accessing privacy risk information related to a plurality of privacy risks in an application (step S410). In some implementations, the privacy risk information may be accessed by privacy risk assessment device 110 (e.g., using a privacy risk information engine, such as engine 330) and may include the information described above. For example, the privacy risk information may include, for each of the privacy risks, privacy impact information, data sensitivity type information, nature of deployment information, compensating controls information, discovery skills information, and correlation impact information. In some implementations, accessing the privacy risk engine may include causing the generation of a questionnaire to capture the privacy risk information. For example, privacy risk assessment device 110 (e.g., using a privacy risk information engine, such as engine 330) may cause the generation of a privacy risk questionnaire to be displayed on display 126 of client device 120. In some implementations, the privacy risk questionnaire may be the same as or similar to the privacy risk questionnaire described above.

Process 400 may also include assigning a privacy risk score to each of the privacy risks based on an analysis of the privacy risk information (step S420). For example, privacy risk assessment device 110 (e.g., using a privacy risk assessment engine, such as engine 340) may assign a privacy risk score to each of the privacy risks based on an analysis of the privacy risk information, where the analysis includes a determination of, for each of the privacy risks, a risk impact and a risk likelihood. The determination of the risk impact and the risk likelihood may be performed using, for example, the methods described above. For example, the risk impact and the risk likelihood may be based on weighted scores assigned based on the privacy impact information.

Process 400 may also include causing an indicator to be superimposed on a display of code in the application corresponding to each of the privacy risks (step S430). For example, privacy risk assessment device 110 (e.g., using a privacy risk assessment engine, such as engine 340) may cause an indicator to be superimposed on the display of code in the application corresponding to each of the privacy risks, and the indicator may be based on the privacy risk score. In some implementations, the indicator may be a form of highlighting, and the display of the code may be highlighted a particular color based on the corresponding severity of the privacy risk associated with the code. In some implementations, the indicator may be text, graphics, combinations of text and graphics, and/or any other suitable indicator, such as indicators described above. Additional examples of causing an indicator to be superimposed on a display of code are described above with respect to, for example, FIGS. 2 and 3. Once steps S410, S420, and/or S430 are complete, process 400 may end.

FIG. 5 is a flow chart of an example process 500 for privacy risk assessment consistent with disclosed implementations. Although execution of process 500 is described below with reference to system 100 of FIG. 1 and/or specific components of system 100, other suitable systems for execution of at least one step of process 500 may be used. For example, processes described below as being performed by privacy risk assessment device 110 may be performed by privacy risk assessment device 210, privacy risk assessment device 310, and/or any other suitable system. Process 500 may be implemented in the form of executable instructions stored on a machine-readable storage medium and/or in the form of electronic circuitry.

Process 500 may start (step S505) during application development and/or after an application has been developed. Process 500 may include automatically identifying privacy risks in an application based on an analysis of application code (step S510). The analysis of the application code may be performed using, for example, the methods described above such as by privacy risk assessment device 110 performing data flow scanning and/or code scanning. Process 500 may also include receiving, for each of the plurality risks, privacy risk information indicating a privacy impact, a data sensitivity type, a nature of deployment, compensation controls, discovery skills, and correlation impact (step S520). The information may be received using the methods described above (e.g., received based on the results of a privacy risk questionnaire transmitted by client device 120 to privacy risk assessment device 110, where privacy risk assessment device 110 may cause the generation of the privacy risk questionnaire to capture the privacy risk information and may cause the display of the privacy risk questionnaire on a display device, such as display 126 of client device 120). The privacy risk information may be received based on the use of a single privacy risk questionnaire for an entire application, or multiple privacy risk questionnaires (e.g., a separate questionnaire for each identified privacy risk).

Process 500 may also include determining a privacy score for each of the privacy risks based on the privacy risk information (step S530). The privacy risk score may represent a privacy risk severity and may be based on a risk impact and a risk likelihood. For example, the privacy risk score may be determined using the methods described above (e.g., privacy risk assessment device 110 may determine the risk impact and the risk likelihood, where the risk impact may be based on a privacy impact score and a data type sensitivity score and the risk likelihood may be based on a nature of deployment score, a compensating controls score, and a discovery skills score).

Process 500 may also include automatically identifying risk remediation options for each of the privacy risks based on the privacy risk score (step S540). For example, the automatic identification of the risk remediation options may be performed by privacy risk assessment device 110 using the methods described above (e.g., based on comparing the identified risk and/or the assessed severity to a set of rules stored in a storage device, such as storage device 130. Once steps S510, S520, S530, and/or S540 are complete, process 500 may end (step S555).

The disclosed examples may include systems, devices, machine-readable storage media, and methods for privacy risk assessments. For purposes of explanation, certain examples are described with reference to the components illustrated and/or described in FIGS. 1-5. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by this terms. Instead, these terms are used to distinguish one element from another.

Further, the sequence of operations described in connection with FIGS. 1-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order, including those described with respect to FIGS. 1-5. Thus, the present disclosure merely sets forth possible examples of implementations, and many variations and modifications may be made to the described examples. All such modifications and variations are intended to be included within the scope of this disclosure and protected by the following claims.

We claim:

1. A system for privacy risk assessment comprising:
a privacy risk identification engine to automatically identify a plurality of privacy risks in an application based on an analysis of application code comprising a plurality of portions, wherein each of the plurality of privacy risks is associated with one or more of the portions of the application code; and
a privacy risk assessment engine to:
for each privacy risk of the plurality of privacy risks, determine a risk impact value based at least on a privacy impact score and a data type sensitivity score, wherein the privacy impact score is a measure of a business impact of each privacy risk;
for each privacy risk of the plurality of privacy risks, determine a risk likelihood value based at least on a compensating controls score, wherein the compensating controls score is a measure of a level of existing controls that compensate for each privacy risk;
for each privacy risk of the plurality of privacy risks, determine a privacy risk score based at least on the determined risk impact value and the determined risk likelihood value of each privacy risk; and
cause a plurality of indicators to be displayed on a display of the application code, wherein each indicator of the plurality of indicators is superimposed on a corresponding portion of the application code and indicates the privacy risk score for a privacy risk associated with the corresponding portion of the application code.

2. The system of claim 1, wherein the analysis of the application code includes data flow scanning and code scanning.

3. The system of claim 1, wherein the privacy impact score and the compensating controls score are based on privacy risk information, and wherein a privacy risk information engine obtains the privacy risk information by:
generating a privacy risk questionnaire; and
receiving a response to the privacy risk questionnaire, the response including the privacy risk information.

4. The system of claim 3, wherein the privacy risk questionnaire includes questions relating to at least two of privacy impact, data sensitivity type, nature of deployment, compensating controls, discovery skills, and correlation impact.

5. The system of claim 3, wherein:
the privacy risk information includes, for each privacy risk of the plurality of privacy risks, privacy impact information, data sensitivity type information, nature of deployment information, compensating controls information, discovery skills information, and correlation impact information.

6. The system of claim 1, wherein, for each privacy risk of the plurality of privacy risks:
the privacy risk assessment engine is to determine the risk likelihood value based on a nature of deployment score, the compensating controls score, and a discovery skills score, wherein the discovery skills score is a measure of skills required to exploit a particular privacy risk.

7. The system of claim 6, wherein each of the privacy impact score, the data type sensitivity score, the nature of deployment score, and the compensating controls score is assigned a different weighting factor.

8. The system of claim 1, wherein the privacy risk assessment engine is to:
categorize each privacy risk of the plurality of privacy risks based on the privacy risk score; and
assign an indicator to each privacy risk of the plurality of privacy risks based on the categorization.

9. The system of claim 8, wherein the privacy risk assessment engine is to:
determine risk remediation options for each privacy risk of the plurality of privacy risks based on the privacy risk score; and
automatically generate a product risks working report, the product risks working report including each privacy risk of the plurality of privacy risks and the risk remediation options.

10. A method comprising:
identifying, by a processor, a plurality of privacy risks in an application based on an analysis of application code comprising a plurality of portions, wherein each of the plurality of privacy risks is associated with one or more of the portions of the application code;
for each privacy risk of the plurality of privacy risks, the processor determining a risk impact value based at least on a privacy impact score and a data type sensitivity score, wherein the privacy impact score is a measure of a business impact of each privacy risk;
for each privacy risk of the plurality of privacy risks, the processor determining a risk likelihood value based at least on a compensating controls score, wherein the compensating controls score is a measure of a level of existing controls that compensate for each privacy risk;
for each privacy risk of the plurality of privacy risks, the processor determining a privacy risk score based at least on the determined risk impact value and the determined risk likelihood value of each privacy risk; and
causing, by the processor, a plurality of indicators to be displayed on a display of the application code, wherein each indicator of the plurality of indicators is superimposed on a corresponding portion of the application code and indicates the privacy risk score for a privacy risk associated with the corresponding portion of the application code.

11. The method of claim 10, including generating the privacy impact score and the compensating controls score based on privacy risk information, wherein the privacy risk information is obtained from a privacy risk questionnaire.

12. The method of claim 11, including, for each privacy risk of the plurality of privacy risks:
determining the risk likelihood value based on the compensating controls score, a nature of deployment score, and a discovery skills score.

13. A non-transitory machine-readable storage medium including instructions which, when executed by a processor, cause the processor to:
automatically identify a plurality of privacy risks in an application based on an analysis of application code comprising a plurality of portions, wherein each of the plurality of privacy risks is associated with one or more of the portions of the application code;
for each privacy risk of the plurality of privacy risks, determine a risk impact value based at least on a privacy impact score and a data type sensitivity score, wherein the privacy impact score is a measure of a business impact of each privacy risk;
for each privacy risk of the plurality of privacy risks, determine a risk likelihood value based at least on a compensating controls score, wherein the compensating controls score is a measure of a level of existing controls that compensate for each privacy risk;

for each privacy risk of the plurality of privacy risks, determine a privacy risk score based at least on the determined risk impact value and the determined risk likelihood value of the privacy risk; and cause a plurality of indicators to be displayed on a display of the application code, wherein each indicator of the plurality of indicators is superimposed on a corresponding portion of the application code and indicates the privacy risk score for a privacy risk associated with the corresponding portion of the application code.

14. The non-transitory machine-readable storage medium of claim 13, including instructions executable to cause the processor to:

determine the risk likelihood value based on a nature of deployment score, the compensating controls score, and a discovery skills score, wherein the discovery skills score is a measure of skills required to exploit a particular privacy risk.

15. The non-transitory machine-readable storage medium of claim 14, wherein each of the privacy impact score, the data type sensitivity score, the nature of deployment score, and the compensating controls score is assigned a different weighting factor.

16. The non-transitory machine-readable storage medium of claim 13, including instructions which, when executed by a processor, cause the processor to:

automatically identify risk remediation options for each privacy risk of the plurality of privacy risks based on the privacy risk score of the privacy risk.

17. The non-transitory machine-readable storage medium of claim 13, wherein each indicator of the plurality of indicators has one of a plurality of colors, wherein the color of the indicator indicates the privacy risk score of the privacy risk.

18. The system of claim 1, wherein each indicator of the plurality of indicators has one of a plurality of colors, wherein the color of the indicator indicates the privacy risk score of the privacy risk.

19. The method of claim 10, wherein the indicator of the plurality of indicators has a particular color that indicates the privacy risk score of the privacy risk.

20. The method of claim 10, comprising:

automatically identifying risk remediation options for each privacy risk of the plurality of privacy risks based on the privacy risk score of the privacy risk.

* * * * *